United States Patent [19]

Livet et al.

[11] 4,345,485
[45] Aug. 24, 1982

[54] TEMPORARY LOCKING DEVICE FOR INERTIA WHEEL

[75] Inventors: Jean-Luc Livet, Palaiseau; Maurice Bretaudeau, Fontenay le Fleury, both of France

[73] Assignee: Societe Nationale Industrielle et Aerospatiale, France

[21] Appl. No.: 133,997

[22] Filed: Mar. 26, 1980

[30] Foreign Application Priority Data

Mar. 30, 1979 [FR] France .............................. 79 08013

[51] Int. Cl.³ ............................................ G01C 19/24
[52] U.S. Cl. ...................................................... 74/5.1
[58] Field of Search ........................ 74/5.1, 5.12, 5.14

[56] References Cited

U.S. PATENT DOCUMENTS

| | | | |
|---|---|---|---|
| 3,019,662 | 2/1962 | Gahn | 74/5.1 X |
| 3,451,289 | 6/1969 | Edmonds et al. | 74/5.12 |
| 3,534,617 | 10/1970 | D'Eri | 74/5.1 |
| 4,155,521 | 5/1979 | Evans et al. | 74/5.1 X |

FOREIGN PATENT DOCUMENTS

| | | |
|---|---|---|
| 2436006 | 2/1976 | Fed. Rep. of Germany . |
| 1242638 | 8/1960 | France .............................. 74/5.1 |
| 2389023 | 11/1978 | France . |

*Primary Examiner*—Rodney H. Bonck
*Attorney, Agent, or Firm*—Karl W. Flocks; A. Fred Starobin

[57] ABSTRACT

A temporary locking device for a rotor of an inertia wheel, sustained, with respect to a stator, by magnetic means and associated with two emergency bearings having a conical bearing surface for each said emergency bearing. A complementary conical bearing surface is provided for each of said conical bearing surfaces, one of the two conical bearing surfaces being able to come into mechanical contact with said complementary bearing surface, and one of said complementary bearing surfaces being rendered axially movable. Thus the rotor can be immobilized against three degrees of freedom, two radially and one axially, after placing said bearing surfaces in mechanical contact, said rotor remaining free to rotate. The device is particularly useful for satellites.

11 Claims, 4 Drawing Figures

TEMPORARY LOCKING DEVICE FOR INERTIA WHEEL

FIELD OF THE INVENTION

The present invention relates to the field of space vehicles and relates, more particularly, to inertia wheels for satellites.

Such inertia wheels include, in their present most advanced designs, magnetic suspension systems with magnets and/or servo-coupled electromagnetic bearings, in addition to their usual electromagnetic drive means.

In such systems, the rotary part of the wheel or rotor is spaced from the stator by a fraction of a millimeter in normal operation while conventional emergency bearings, of the ball-bearing type for example, provide when necessary, for the support of the rotor on the stator, in order to prevent the magnetic suspension parts from being able to come into mechanical contact.

DESCRIPTION OF THE PRIOR ART

Known temporary immobilising devices for an inertia wheel rotor, used in particular in the satellite launch phase, usually provide for the complete subjugation of this rotor, that is to say its immobilisation axially, radially and in rotation.

Such immobolizing devices are relatively heavy and complex to put into practice and constitute, in any case, a separate sub-assembly from the wheel proper.

A well-known example of such a device includes a set of segments with radial wedging action which come into sliding gripping relationship, conjointly, with two rings with inclined sides, one being fast to the rotor, the other to the stator, so that the four degrees of freedom of the rotor are thus cancelled.

Considering the fact that the immobilizing of the rotation of the rotor was partly the cause of the complexity of these known devices and that this did not reveal itself to be systematically necessary, Applicants were led to conceive a temporary immobolizing device according to which the cancelling of only three degrees of freedom is provided, the rotation of the rotor remaining free during the locking action.

It is an object of the present invention to provide a temporary locking device for a rotor suspended, with respect to a stator, by magnetic means and associated with two emergency bearings, characterised in that each of said emergency bearings has a conical bearing surface which can come into mechanical contact with a complementary conical bearing surface, one of the two complementary bearing surfaces being rendered axially mobile, so that said rotor can be immobilized against three degrees of freedom, two radially and one axially, after placing said bearing surfaces in mechanical contact, the rotor remaining free to rotate.

BRIEF DESCRIPTION OF THE DRAWINGS

Other features and advantages of the present invention will become apparent from the description which follows taken in conjunction with the accompanying drawings in which.

DESCRIPTION OF A PREFERRED EMBODIMENT

Figure 1:
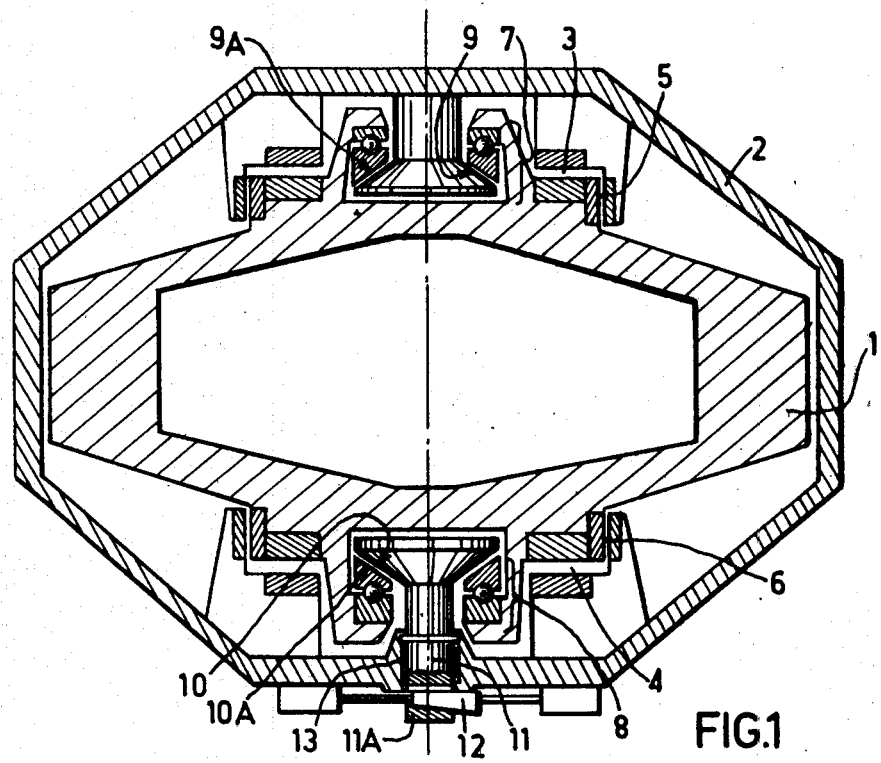
FIG. 1 is a diagrammatic view, in axial section, showing an inertia wheel provided with a temporary locking device according to the invention, in unlocked position.

An inertia wheel according to the invention, shown very diagrammatically in FIG. 1, includes essentially a rotor 1, a stator 2 forming an outer enclosure and magnetic suspension devices constituted by a top magnetic centering member 3 (conventionally called "top"), a bottom magnetic centering member 4 (conventionally called "bottom"), an electromagnetic actuator 5 and an electromagnetic drive motor 6.

These elements are completed by a top emergency bearing 7 (conventionally called "top"), a bottom emergency bearing 8 (conventionally called "bottom") according to which a bearing surface 9 of an inner cone, fast to the stator, is provided to receive, in mechanical contact, a corresponding bearing surface 9A of an outer cone of the rotor 1, when said rotor is urged in downward axial movement ("downward" by convention) and, reciprocally, a bearing surface 10 of an inner cone, fast to the stator, receives a corresponding bearing surface 10A of an outer cone of the rotor on upward (conventionally) movement of the latter.

According to the invention, one of the bearing surfaces of the emergency bearings, the bearing surface 10 in the example of FIG. 1, is designed to be rendered axially mobile, so that it then constrains the rotor 1 to be supported, conjointly, on the bearing surface 10 as on the fixed bearing surface 9 resulting, correlatively, in the desired cancelling of the three degrees of freedom, namely one axially and two radially, the rotation of the rotor remaining for its part completely free.

The axial movement of the bearing surface 10 being reversible, the initial position of the rotor is recoverable by a reverse movement of this same bearing surface 10.

As the problem posed involves the immobilizing of the rotor essentially during the launch phase of the satellite, which involves a very intensely vibrating environment risking the irremediable damage of the magnetic parts. There is provided, in practice, the furnishing of the temporary immobilizing device with means for the sudden freeing of the rotor when the satellite arrives, for example, in the orbital phase.

Figure 4:
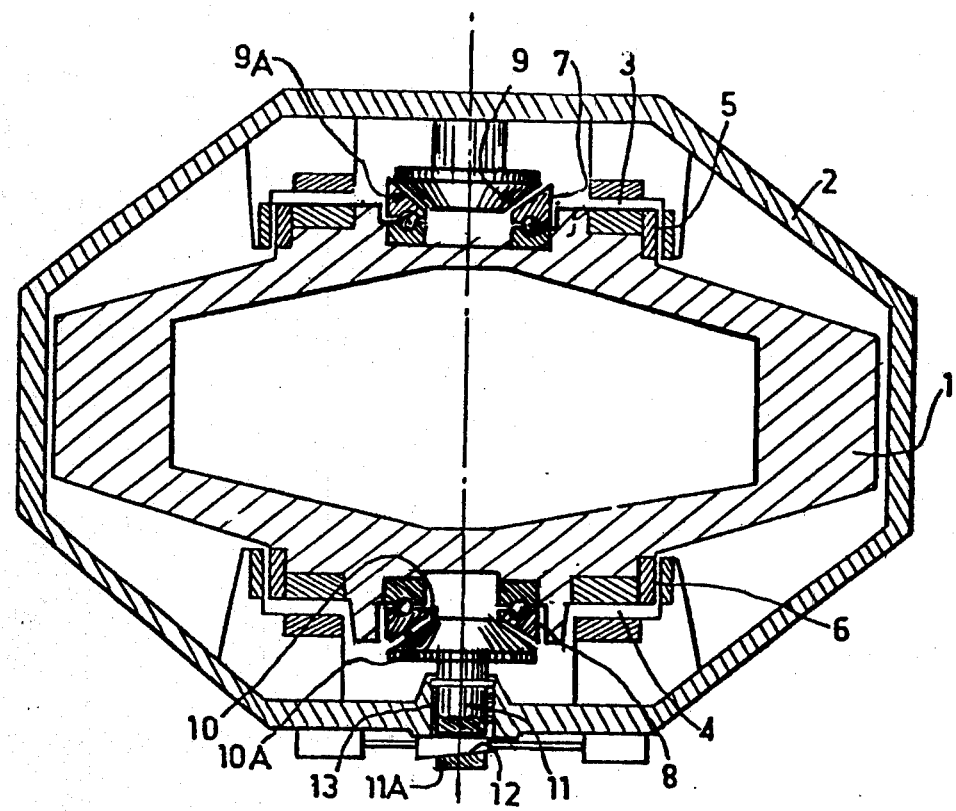
FIG. 4 is a view similar to FIG. 1, but of a modified embodiment.

The remainder of the description set forth, in more detail, how the axial movement of the movable conical bearing surface 10 is realized in practice; said movable conical bearing surface being positioned between the stator and the emergency bearing race connected to the rotor in accordance with the modified embodiment illustrated in FIG. 4, or between the rotor and the emergency bearing, when this bearing is connected to the rotor as shown in FIG. 1.

In the embodiment of FIG. 1, the movable bearing surface 10 is fast to a sliding guide 11 of which one end 11A extends from the stator part 2. A traversing wedge 12 with an inclined flat surface 12A is supported, firstly on the stator portion and, secondly, against an oblique ramp 11B formed in the end portion 11A to generate, on radial movement of this wedge, an axial movement of the bearing surface 10.

The locking action of the rotor is opposed to the action of an elastic system 13 which tends to keep the movable bearing surface 10 in unlocked position.

Figure 2:
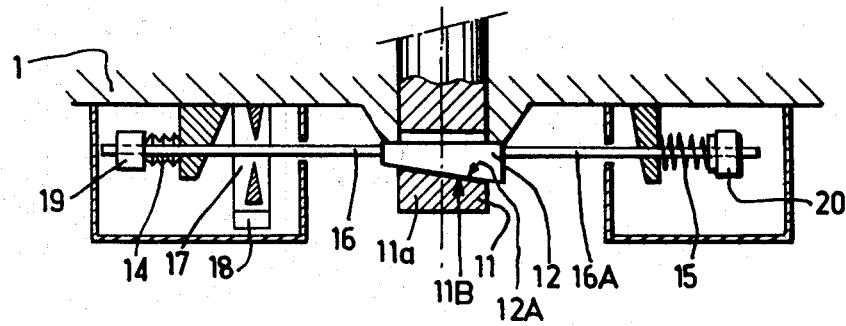
FIG. 2 is a diagrammatic view, showing, in partial section, the locking mechanism according to FIG. 1, in locked position.

The wedge 12 is in fact controlled with respect to radial movement, by a mechanism with two opposed springs (14 and 15) acting through coupling rods 16, 16A, as shown diagrammatically in FIG. 2.

The operation of such mechanism is enabled by the fact that, on the one hand, the spring 14, generally constituted by a stack of spring washers, is more powerful than the helical spring 15, so as to keep the wedge 12 in its end position and that, on the other hand, after the rupture of the rod 16, produced at 17 by the effect of a pyrotechnic charge 18 for example, said wedge 12 then is immediately influenced by the spring 15, which has been compressed until then, thereby enabling the guide 11 in the same stroke, the guide 11, to lift the bearing surface 10 by means of elastic device 13 which can be a spring and to thus unlock, the system as shown in FIG. 1.

It should be noted that the unlocking can be produced momentarily, for checking for example, by means of the action of a screw-nut system 19 and that the force associated with the return of the wedge 12 can be controlled by the action of another screw-nut regulating system 20.

Figure 3:
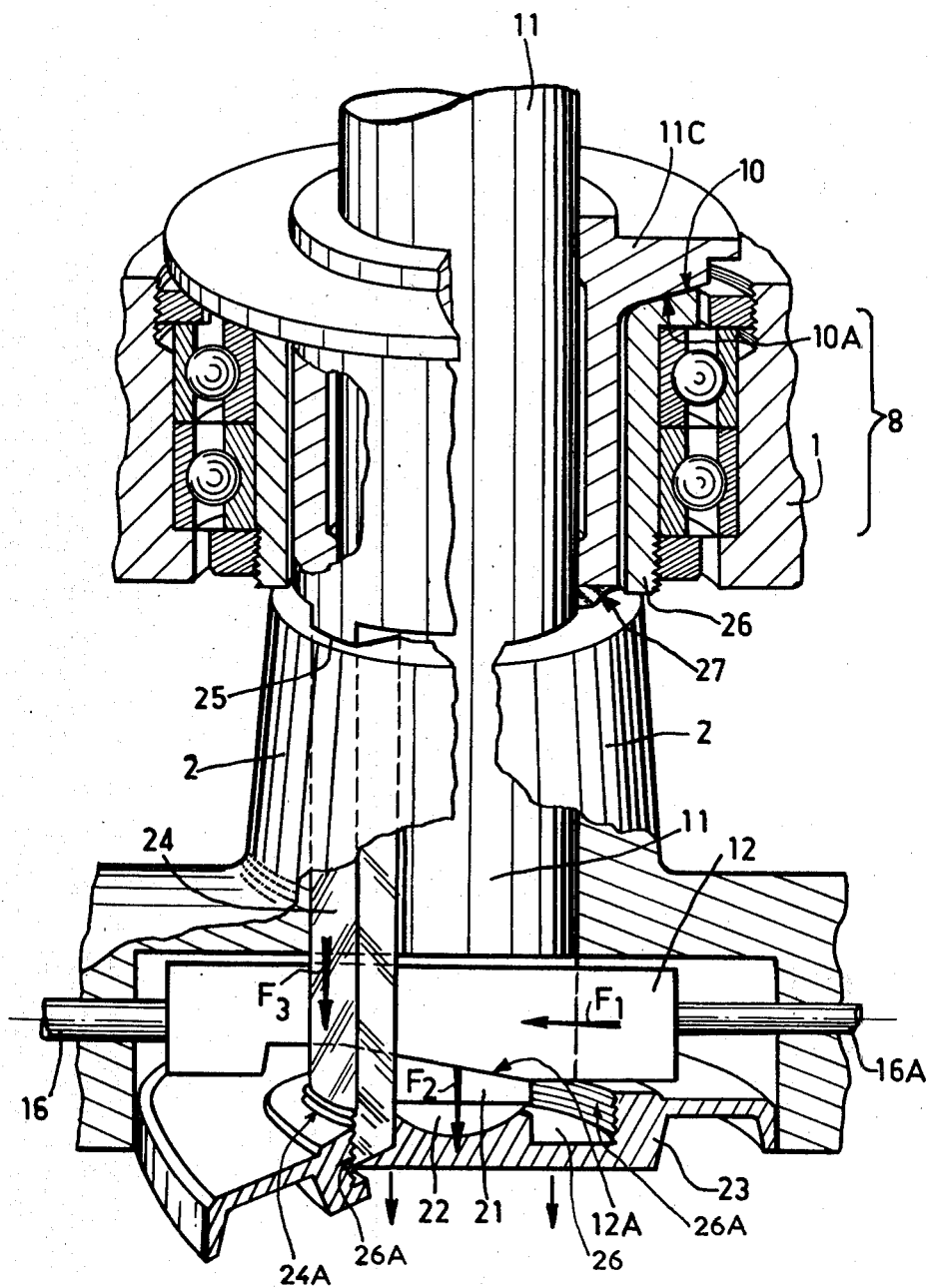
FIG. 3 is a partial perspective view, with a portion torn away, showing the mechanism of coupling with the rotor, to enable the locking and unlocking thereof, according to a developed embodiment of the invention.

In the embodiment of FIG. 3, applicable to a satellite kinetic wheel, the end portion of the guide 11 is in the form of a conical shim 21, supported, through a ball-joint 22, on an axially guided base 23, fast to four equidistant tongues 24 restricted in sliding movement, in grooves 25 formed in the stator 2 (for clarity in the drawing, a single tongue 24 has been shown).

The tongues 24 form part of a sliding sleeve 11C which surrounds the guide 11 and is associated with the bearing surface 10.

The base 23 is provided with an inner annular groove 26, one of the sides 26A of which is threaded to receive the free end 24A, of each tongue which is also threaded.

The previously described function is accomplished mechanically as the wedge 12 in its radial movement (note arrow F1) acts to cause the shim 21 to push (note arrow F2), the base 23 which, in turn causes (note arrow F3) the tongues 24 to be fast to the sleeve 11C, to finally bring the bearing surface 10 into mechanical contact with the bearing surface 10A and to drive the rotor 1 in axial movement downward (by convention) to cause the bearing surface 9A to position itself to bear upon the bearing surface 9 of the stator and to obtain the locking of the rotor axially and radially, the rotation of the rotor remaining free during this locking.

The return to unlocked state is achieved by means of elastic blades 27 which ensure the movement of the sleeve 11C.

In the operation of the embodiment of FIG. 4, with the wedge 12 shown therein, spring 13 must hold the movable bearing surface 10 against bearing race 8 to cage the rotor 1 with rightward movement of wedge 12 serving to pull movable bearing surface 10 down to release rotor 1. FIG. 4 shows the device in the position it would occupy after charge 18 has caused the severing of rod 16.

It should be observed that the mechanism is particularly well integrated between the rotor and the stator and that the unlocking can be produced, instantaneously, without inducing interfering actions which are always prejudicial to the rotor.

It should also be noted that the conical bearing surfaces preserve the centering during axial movement and that said centering can, for example, be determined as soon as the magnetic suspension devices come into play.

It will be obvious to one skilled in the art, that the mechanical device with the inclined flat surface and radial action as has been described herein may be replaced by any other equivalent mechanical means, to effect the axial movement of one of the emergency bearing surfaces so as to place the rotor in supported configuration.

In the same way, the method of instantaneous freeing of this inclined flat surface can be achieved by any suitable means other than the pyrotechnic means which has been employed in the present case by reason of its convenience of use and its reliability in a satellite.

In general, the mechanisms described have been shown only by way of example; and, any other equivalent devices capable of producing the same modes of action on the conical bearing surfaces between emergency bearings and an axial guide, would remain within the scope of the invention as defined by the following claims.

We claim:

1. Temporary locking device for a rotor of an inertia wheel, sustained with respect to a stator, by magnetic means and associated with two emergency bearings comprising:

a conical bearing surface for each said emergency bearings;

a complementary conical bearing surface for each of said conical bearing surfaces, one of the two conical bearing surfaces being able to come into mechanical contact with said complementary bearing surface, and one of said complementary bearing surfaces being rendered axially movable;

so that said rotor can be immobilised for three degrees of freedom, two radially and one axially, after placing said bearing surfaces in mechanical contact, said rotor remaining free to rotate.

2. Device according to claim 1, wherein said movable complementary bearing surface is placed between said stator and said emergency bearing connected to said rotor.

3. Device according to claim 1, wherein said movable complementary bearing surface is placed between said rotor and said emergency bearing connected to the rotor.

4. Device according to claim 1, comprising:

a wedge whose radial movements produce the axial mobility of one of said complementary bearing surfaces;

an axially sliding guide of which one end emerges from said stator to be traversed by said wedge, said complementary bearing surface being connected to said guide.

5. Temporary locking device for a rotor of an inertia wheel suspended, with respect to a stator, by magnetic means and associated with two emergency bearings comprising:

a conical bearing surface for each of said emergency bearings;

a complementary conical bearing surface for each of said conical bearing surfaces, one of the two conical bearing surfaces being able to come into mechanical contact with said complementary bearing surface, and one of said complementary bearing surfaces being rendered axially movable;

a wedge whose radial movements produce the axial mobility of one of said complementary bearing surfaces;

a guide sliding axially of which one end emerges from said stator to be traversed by said wedge, said complementary bearing surface being connected to said guide;

a locking spring and an unlocking spring, said locking spring being more powerful than said unlocking spring, the movement of said wedge resulting from the opposing action of said locking spring and said unlocking spring;

means causing the immediate stopping of the action of said locking spring;

so that said rotor can be immobilised for three degrees of freedom, two radially and one axially, after placing said bearing surfaces in mechanical contact, said rotor remaining free to rotate.

6. Device according to claim 5, comprising:

a mechanical coupling between said wedge and said locking spring;

a sudden rupture means for said mechanical coupling which means constitutes the said immediate stopping means for the action of said locking spring.

7. Device according to claim 5, comprising:

a mechanical coupling between said wedge and said locking spring;

a pyrotechnic charge;

a cutter actuated by said pyrotechnic charge and constituting a sudden rupture means for said mechanical coupling.

8. Device according to claim 5, wherein means are provided to produce, momentarily, the release of said locking spring.

9. Device according to claim 5, wherein adjusting means are provided to act on said unlocking spring and thus produce an adjustment for the speed of movement of said wedge.

10. Temporary locking device for an inertia wheel rotor sustained, with respect to the stator, by magnetic means and associated with two emergency bearings comprising:

a conical bearing surface for each of said emergency bearings;

a complementary conical bearing surface for each of said conical bearing surfaces, one of the two bearing surfaces being able to come into mechanical contact with said complementary bearing surface, and one of said complementary surfaces being rendered axially mobile;

a wedge of which the radial movements produce the axial mobility of one of said complementary bearing surfaces;

a guide sliding axially of which one end emerges from said stator to be traversed by said wedge, said complementary bearing surface being connected to said guide;

grooves formed in said stator;

tongues connected to said complementary bearing surface and capable of sliding in said grooves;

a guided base made fast to said tongues;

a ball-joint;

a conical shim cooperating with said radially moving wedge and supported, through said ball-joint, on said guided base;

so that said rotor can be immobilised for three degrees of freedom, two radially and one axially, after placing said bearing surfaces in mechanical contact, said rotor remaining free to rotate.

11. Temporary locking device for a rotor of an inertia wheel sustained, with respect to a stator, by magnetic means and associated with two emergency bearings, comprising:

a conical bearing surface for each of said emergency bearings;

a complementary conical bearing surface for each of said conical bearing surfaces, one of the two conical bearing surfaces being able to come into mechanical contact with said complementary bearing surface, and one of said complementary bearing surfaces being rendered axially mobile;

a wedge whose radial movements produce the axial mobility of one of said complementary bearing surfaces;

a guide sliding axially of which one end emerges from said stator to be traversed by said wedge, said complementary bearing surface being coupled to said guide;

grooves formed in said stator;

tongues coupled to said complementary bearing surface and capable of sliding in said grooves;

a guided base made fast to said tongues;

a ball-joint;

a conical shim cooperating with said radially moving wedge and supported, through said ball-joint, on said guided base;

a locking spring and an unlocking spring, said locking spring being more powerful than said unlocking spring, the movements of said wedge resulting from the opposing action of said locking spring and said unlocking spring;

a means causing the immediate stopping of the action of said locking spring;

so that said rotor can be immobilised for three degrees of freedom, two radially and one axially, after placing said bearing surfaces in mechanical contact, said rotor remaining free to rotate.

* * * * *